United States Patent
Sheng et al.

(10) Patent No.: US 11,514,166 B2
(45) Date of Patent: Nov. 29, 2022

(54) SYSTEMS AND METHODS TO PROTECT UNIFIED EXTENSIBLE FIRMWARE INTERFACE PROTOCOL SERVICEABILITY

(71) Applicant: Dell Products L.P., Round Rock, TX (US)

(72) Inventors: Yu-Cheng Sheng, Taoyuan (TW); PoYu Cheng, Tainan (TW); Yu-Hsuan Yang, Taoyuan (TW)

(73) Assignee: Dell Products L.P., Round Rock, TX (US)

( * ) Notice: Subject to any disclaimer, the term of this patent is extended or adjusted under 35 U.S.C. 154(b) by 183 days.

(21) Appl. No.: 17/075,381

(22) Filed: Oct. 20, 2020

(65) Prior Publication Data
US 2022/0121747 A1     Apr. 21, 2022

(51) Int. Cl.
*G06F 21/57* (2013.01)
*G06F 8/61* (2018.01)

(52) U.S. Cl.
CPC .............. *G06F 21/572* (2013.01); *G06F 8/62* (2013.01); *G06F 21/575* (2013.01); *G06F 2221/034* (2013.01)

(58) Field of Classification Search
CPC ...... G06F 21/572; G06F 21/575; G06F 21/50; G06F 21/54; G06F 21/78; G06F 8/61; G06F 8/62; G06F 2221/034
See application file for complete search history.

(56) References Cited

U.S. PATENT DOCUMENTS

| 7,484,083 B1* | 1/2009 | Ilyasov | G06F 9/4411 713/1 |
| 2004/0268368 A1* | 12/2004 | Doran | G06F 21/554 719/321 |
| 2005/0114639 A1* | 5/2005 | Zimmer | G06F 9/4401 712/244 |
| 2008/0028200 A1* | 1/2008 | Polyudov | G06F 9/4411 713/2 |
| 2011/0302444 A1* | 12/2011 | Tashima | G06F 9/4411 714/2 |

(Continued)

FOREIGN PATENT DOCUMENTS

WO   WO-2021040701 A1 *  3/2021  ........... G06F 21/575

OTHER PUBLICATIONS

Kovah, Xeno et al. "Analyzing UEFI BIOS from Attacker & Defender Viewpoints", 2014. (Year: 2014).*

*Primary Examiner* — Michael Simitoski
(74) *Attorney, Agent, or Firm* — Jackson Walker L.L.P.

(57) ABSTRACT

A method may include, in an information handling system comprising a basic input/output system (BIOS) embodied in non-transitory computer-readable media and configured to be the first code executed by a processor when the information handling system is booted and configured to initialize components of the information handling system into a known state: receiving an indication of installation of a protocol by a producer driver of a plurality of protocol drivers integral to the BIOS, storing metadata regarding the protocol in a protocol database of the BIOS, receiving a request to consume the protocol by a consumer driver of the plurality of protocol drivers, and obfuscating the metadata stored in the protocol database from the consumer driver to prevent the consumer driver from uninstalling the protocol.

18 Claims, 2 Drawing Sheets

(56) References Cited

U.S. PATENT DOCUMENTS

| | | | | |
|---|---|---|---|---|
| 2013/0263262 A1* | 10/2013 | Forristal | ............... | G06F 21/577 |
| | | | | 726/22 |
| 2015/0235030 A1* | 8/2015 | Chaiken | ................ | G06F 21/572 |
| | | | | 726/22 |
| 2016/0103693 A1* | 4/2016 | Berlin | ................. | G06F 9/44521 |
| | | | | 719/327 |
| 2016/0253501 A1* | 9/2016 | Wynn | ........................ | G06F 8/61 |
| | | | | 726/23 |
| 2020/0364341 A1* | 11/2020 | Ochiai | .................... | G06F 21/73 |
| 2021/0334379 A1* | 10/2021 | Samuel | ................. | G06F 21/572 |
| 2022/0012342 A1* | 1/2022 | Liu | ........................ | G06F 21/577 |

* cited by examiner

SYSTEMS AND METHODS TO PROTECT UNIFIED EXTENSIBLE FIRMWARE INTERFACE PROTOCOL SERVICEABILITY

TECHNICAL FIELD

The present disclosure relates in general to information handling systems, and more particularly to methods and systems for protecting protocol serviceability in a basic input/output system (BIOS) of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As is known in the art, an information handling system may include a basic input/output system (BIOS). Generally speaking, a BIOS may include any system, device, or apparatus configured to identify, test, and/or initialize information handling resources of an information handling system. In some instances, a BIOS may include a Unified Extensible Firmware Interface (UEFI). A BIOS may comprise boot firmware configured to be the first code executed by an information handling system when the information handling system is booted and/or powered on. As part of its initialization functionality, code for a BIOS may be configured to set components of an information handling system into a known state, so that one or more applications (e.g., an operating system or other application programs) stored on compatible media may be executed by and given control of the information handling system.

A portion of BIOS or UEFI functionality may be implemented using one or more protocol drivers that may define and execute a particular communication protocol. In existing implementations of BIOS, there are no security standards to protect protocols installed by a driver from other drivers. Thus, it may be possible for important protocols to be unexpectedly uninstalled, which may jeopardize protocol serviceability and reliability. Unexpected installation of a protocol may also undermine services and protections in a system or change its behaviors to suit the needs of a malicious actor.

SUMMARY

In accordance with the teachings of the present disclosure, the disadvantages and problems associated with protection of drivers in a BIOS may be reduced or eliminated.

In accordance with embodiments of the present disclosure, an information handling system may include a processor and a basic input/output system (BIOS) embodied in non-transitory computer-readable media and configured to be the first code executed by the processor when the information handling system is booted and configured to initialize components of the information handling system into a known state, the BIOS comprising a plurality of protocol drivers and a core. The core may be configured to receive an indication of installation of a protocol by a producer driver of the plurality of protocol drivers, store metadata regarding the protocol in a protocol database of the BIOS, receive a request to consume the protocol by a consumer driver of the plurality of protocol drivers, and obfuscate the metadata stored in the protocol database from the consumer driver to prevent the consumer driver from uninstalling the protocol.

In accordance with these and other embodiments of the present disclosure, a method may include, in an information handling system comprising a basic input/output system (BIOS) embodied in non-transitory computer-readable media and configured to be the first code executed by a processor when the information handling system is booted and configured to initialize components of the information handling system into a known state: receiving an indication of installation of a protocol by a producer driver of a plurality of protocol drivers integral to the BIOS, storing metadata regarding the protocol in a protocol database of the BIOS, receiving a request to consume the protocol by a consumer driver of the plurality of protocol drivers, and obfuscating the metadata stored in the protocol database from the consumer driver to prevent the consumer driver from uninstalling the protocol.

In accordance with these and other embodiments of the present disclosure, an article of manufacture may include a non-transitory computer readable medium and computer-executable instructions carried on the computer readable medium, the instructions readable by a processor, the instructions, when read and executed, for causing the processor to, in an information handling system comprising a basic input/output system (BIOS) embodied in non-transitory computer-readable media and configured to be the first code executed by the processor when the information handling system is booted and configured to initialize components of the information handling system into a known state: receive an indication of installation of a protocol by a producer driver of a plurality of protocol drivers integral to the BIOS; store metadata regarding the protocol in a protocol database of the BIOS; receive a request to consume the protocol by a consumer driver of the plurality of protocol drivers; and obfuscate the metadata stored in the protocol database from the consumer driver to prevent the consumer driver from uninstalling the protocol.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
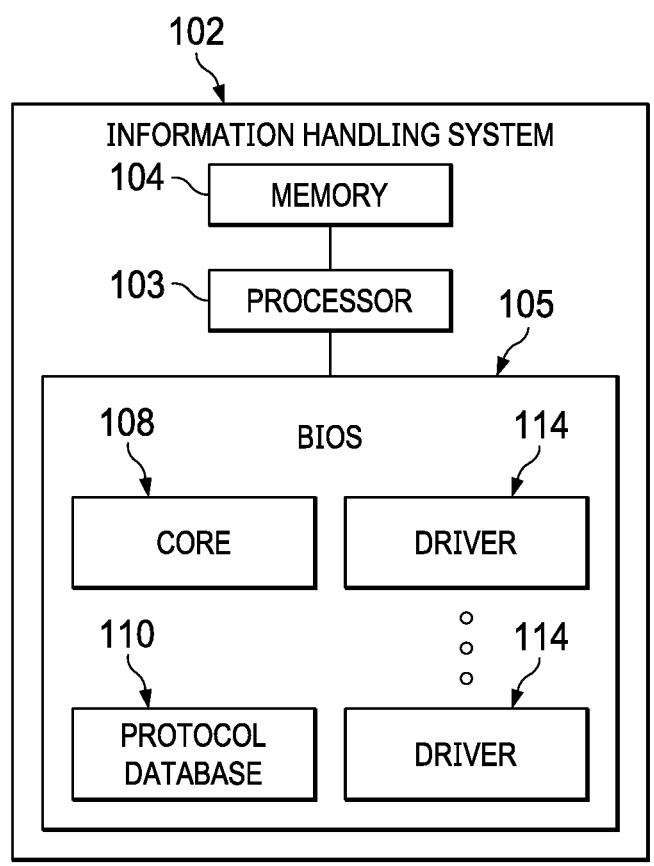
FIG. 1 illustrates a block diagram of an example information handling system, in accordance with embodiments of the present disclosure.
Figure 2:
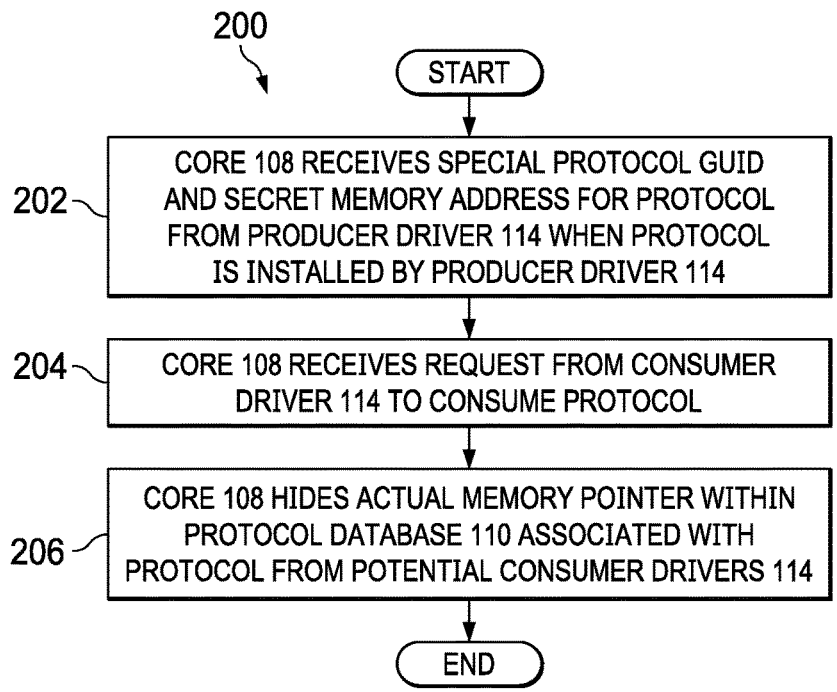
FIG. 2 illustrates a flow chart of an example method for protecting UEFI protocol serviceability, in accordance with embodiments of the present disclosure.
Figure 3:
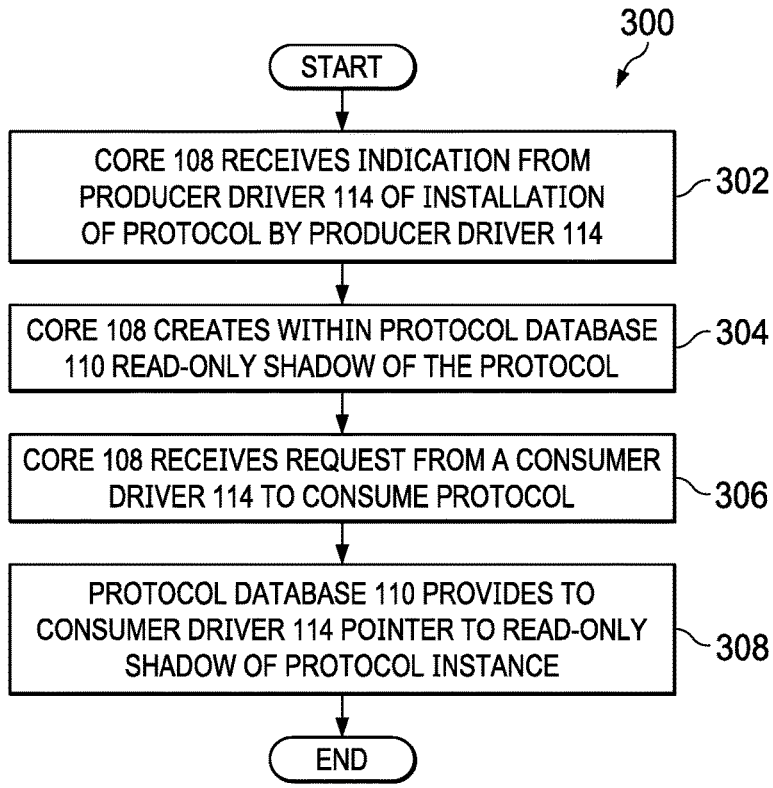
FIG. 3 illustrates a flow chart of another example method for protecting UEFI protocol serviceability, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise or be an integral part of a server. In other embodiments, information handling system 102 may be a personal computer. In these and other embodiments, information handling system 102 may be a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, and a basic input/output (BIOS) system 105 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102. As shown in FIG. 1, BIOS 105 may include a core 108, protocol database 110, and a plurality of protocol drivers 114.

Core 108 may comprise the main executable code for functionality of BIOS 105, including the functionality of BIOS 105 described herein.

Protocol database 110 may comprise any suitable secure map, list, table, or other data structure configured to maintain information regarding protocols installed by protocol drivers 114. Such information may include metadata regarding a protocol, for example global unique identifiers (GUIDs) associated with protocols, pointers to memory addresses at which protocols are stored in memory 104, and/or other suitable metadata.

A protocol driver 114 may comprise a program of executable instructions that provides programming interface to core 108 to control and manage a specific lower level interface that is often linked to a specific type of hardware, or other low-level service, such as a network interface. A "producer" driver 114 may refer to a protocol driver 114 that installs a particular protocol within BIOS 105, while a "consumer" driver 114 may refer to a protocol driver 114 that uses such protocol installed by a producer driver 114. The producer driver 114 of a UEFI protocol may write metadata regarding such UEFI protocol to protocol database 110, as described in greater detail below. It is noted that a driver 114 may be both a producer driver 114 for one protocol and a consumer driver 114 with respect to another protocol.

In operation, to mitigate or eliminate the disadvantages described in the Background section of this application, core 108 may be configured to allow only a producer driver 114 of a protocol to uninstall such protocol by obfuscating within protocol database 110 an actual location of such protocol in memory 104, as described in greater detail below.

In some embodiments, core 108 may be configured to receive a special protocol GUID and secret memory address for a protocol from a producer driver 114 when the protocol is installed by the producer driver 114, wherein such secret memory address may be known only to producer driver 114. In response to receipt of the special protocol GUID and secret memory address, core 108 may hide the actual memory pointer within protocol database 110 associated with the protocol from potential consumer drivers 114. Accordingly, in order to uninstall the protocol, a driver 114 (e.g., producer driver 114) may be required to provide the same secret memory address.

In other embodiments, core 108 may, responsive to installation of a protocol by a producer driver 114, create within protocol database 110 a read-only shadow of the protocol. Accordingly, when a consumer driver 114 consumes the protocol, protocol database 110 does not provide to consumer driver 114 the originally-installed memory pointer to the protocol instance, but instead provides to consumer driver 114 a pointer to a read-only shadow of the protocol instance stored in memory 104. Accordingly, consumer drivers 114 of the protocol may be unable to access the original protocol pointer and thus may be rendered unable to use the original protocol pointer to uninstall the protocol.

In addition to processor 103, memory 104, and BIOS 105, information handling system 102 may include one or more other information handling resources.

FIG. 2 illustrates a flow chart of an example method 200 for protecting UEFI protocol serviceability, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, core 108 may receive a special protocol GUID and secret memory address for a protocol from a producer driver 114 when the protocol is installed by the producer driver 114, wherein such secret memory address may be known only to producer driver 114. At step 204, core 108 may receive a request from a consumer driver 114 to consume the protocol. At step 206, in response to receipt of the special protocol GUID and secret memory address and the request from consumer driver 114, core 108 may hide the actual memory pointer within protocol database 110 associated with the protocol from potential consumer drivers 114. Because the protocol is a shadow copy and is read-only to consumer drivers 114, method 200 may mitigate an unexpected tampering or forging by malicious code of the original protocol.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

FIG. 3 illustrates a flow chart of an example method 300 for protecting UEFI protocol serviceability, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, core 108 may receive an indication from a producer driver 114 of installation of a protocol by producer driver 114. At step 304, core 108 may create within protocol database 110 a read-only shadow of the protocol. At step 306, core 108 may receive a request from a consumer driver 114 to consume the protocol. At step 308, in response to the request, protocol database 110 provides to consumer driver 114 a pointer to a read-only shadow of the protocol instance stored in memory 104, but does not provide to consumer driver 114 the originally-installed memory pointer to the protocol instance.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a processor; and
   a basic input/output system (BIOS) embodied in non-transitory computer-readable media and configured to be the first code executed by the processor when the information handling system is booted and configured to initialize components of the information handling system into a known state, the BIOS comprising:
   a plurality of protocol drivers; and
   a core configured to:
      receive an indication of installation of a protocol by a producer driver of the plurality of protocol drivers;
      store metadata regarding the protocol in a protocol database of the BIOS:
      receive a request to consume the protocol by a consumer driver of the plurality of protocol drivers;
      obfuscate the metadata stored in the protocol database from the consumer driver to prevent the consumer driver from uninstalling the protocol;
      in connection with receipt of the indication of installation, receive a special protocol global unique identifier and a secret memory address for the protocol from the producer driver; and
      in response to receipt of the special protocol global unique identifier and the secret memory address, hide an actual memory pointer within the protocol database and associated with the protocol from the consumer driver.

2. The information handling system of claim 1, wherein the core is further configured to prevent access to the consumer driver of a memory pointer to an instance of the protocol stored in memory by the producer driver.

3. The information handling system of claim 1, wherein the BIOS comprises a Unified Extensible Firmware Interface.

4. An information handling system comprising:
   a processor; and
   a basic input/output system (BIOS) embodied in non-transitory computer-readable media and configured to be the first code executed by the processor when the information handling system is booted and configured to initialize components of the information handling system into a known state, the BIOS comprising:
   a plurality of protocol drivers; and
   a core configured to:
      receive an indication of installation of a protocol by a producer driver of the plurality of protocol drivers;
      store metadata regarding the protocol in a protocol database of the BIOS:
      receive a request to consume the protocol by a consumer driver of the plurality of protocol drivers;
      obfuscate the metadata stored in the protocol database from the consumer driver to prevent the consumer driver from uninstalling the protocol;
      responsive to the indication of installation, create within the protocol database a read-only shadow of the protocol; and
      responsive to the request to consume the protocol by the consumer driver, provide to the consumer driver a pointer to the read-only shadow of the protocol as stored in a memory accessible to the BIOS.

5. The information handling system of claim 4, wherein the core is further configured to prevent access to the consumer driver of a memory pointer to an instance of the protocol stored in memory by the producer driver.

6. The information handling system of claim 4, wherein the BIOS comprises a Unified Extensible Firmware Interface.

7. A method comprising, in an information handling system comprising a basic input/output system (BIOS) embodied in non-transitory computer-readable media and configured to be the first code executed by a processor when the information handling system is booted and configured to initialize components of the information handling system into a known state:

receiving an indication of installation of a protocol by a producer driver of a plurality of protocol drivers integral to the BIOS;

storing metadata regarding the protocol in a protocol database of the BIOS; receiving a request to consume the protocol by a consumer driver of the plurality of protocol drivers; and obfuscating the metadata stored in the protocol database from the consumer driver to prevent the consumer driver from uninstalling the protocol;

in connection with receipt of the indication of installation, receiving a special protocol global unique identifier and a secret memory address for the protocol from the producer driver; and in response to receipt of the special protocol global unique identifier and the secret memory address, hiding an actual memory pointer within the protocol database and associated with the protocol from the consumer driver.

8. The method of claim 7, further comprising preventing access to the consumer driver of a memory pointer to an instance of the protocol stored in memory by the producer driver.

9. The method of claim 7, wherein the BIOS comprises a Unified Extensible Firmware Interface.

10. A method comprising, in an information handling system comprising a basic input/output system (BIOS) embodied in non-transitory computer-readable media and configured to be the first code executed by a processor when the information handling system is booted and configured to initialize components of the information handling system into a known state:

receiving an indication of installation of a protocol by a producer driver of a plurality of protocol drivers integral to the BIOS;

storing metadata regarding the protocol in a protocol database of the BIOS;

receiving a request to consume the protocol by a consumer driver of the plurality of protocol drivers; and obfuscating the metadata stored in the protocol database from the consumer driver to prevent the consumer driver from uninstalling the protocol;

responsive to the indication of installation, creating within the protocol database a read-only shadow of the protocol; and responsive to the request to consume the protocol by the consumer driver, providing to the consumer driver a pointer to the read-only shadow of the protocol as stored in a memory accessible to the BIOS.

11. The method of claim 10, further comprising preventing access to the consumer driver of a memory pointer to an instance of the protocol stored in memory by the producer driver.

12. The method of claim 10, wherein the BIOS comprises a Unified Extensible Firmware Interface.

13. An article of comprising:

a non-transitory computer readable medium; and computer-executable instructions carried on the computer readable medium, the instructions readable by a processor, the instructions, when read and executed, for causing the processor to, in an information handling system comprising a basic input/output system (BIOS) embodied in non-transitory computer-readable media and configured to be the first code executed by the processor when the information handling system is booted and configured to initialize components of the information handling system into a known state:

receive an indication of installation of a protocol by a producer driver of a plurality of protocol drivers integral to the BIOS;

store metadata regarding the protocol in a protocol database of the BIOS;

receive a request to consume the protocol by a consumer driver of the plurality of protocol drivers;

obfuscate the metadata stored in the protocol database from the consumer driver to prevent the consumer driver from uninstalling the protocol;

in connection with receipt of the indication of installation, receive a special protocol global unique identifier and a secret memory address for the protocol from the producer driver; and in response to receipt of the special protocol global unique identifier and the secret memory address, hide an actual memory pointer within the protocol database and associated with the protocol from the consumer driver.

14. The article of claim 13, the instructions for further causing the processor to prevent access to the consumer driver of a memory pointer to an instance of the protocol stored in memory by the producer driver.

15. The article of claim 13, wherein the BIOS comprises a Unified Extensible Firmware Interface.

16. An article of comprising:

a non-transitory computer readable medium; and computer-executable instructions carried on the computer readable medium, the instructions readable by a processor, the instructions, when read and executed, for causing the processor to, in an information handling system comprising a basic input/output system (BIOS) embodied in non-transitory computer-readable media and configured to be the first code executed by the processor when the information handling system is booted and configured to initialize components of the information handling system into a known state:

receive an indication of installation of a protocol by a producer driver of a plurality of protocol drivers integral to the BIOS;

store metadata regarding the protocol in a protocol database of the BIOS;

receive a request to consume the protocol by a consumer driver of the plurality of protocol drivers;

obfuscate the metadata stored in the protocol database from the consumer driver to prevent the consumer driver from uninstalling the protocol;

responsive to the indication of installation, create within the protocol database a read-only shadow of the protocol; and responsive to the request to consume the protocol by the consumer driver, provide to the consumer driver a pointer to the read-only shadow of the protocol as stored in a memory accessible to the BIOS.

17. The article of claim 16, the instructions for further causing the processor to prevent access to the consumer driver of a memory pointer to an instance of the protocol stored in memory by the producer driver.

18. The article of claim 16, wherein the BIOS comprises a Unified Extensible Firmware Interface.

* * * * *